US010836938B2

(12) United States Patent
Karhu et al.

(10) Patent No.: US 10,836,938 B2
(45) Date of Patent: Nov. 17, 2020

(54) ADHESIVE FOR LABELS, A LABEL AND LABEL LAMINATE

(71) Applicant: UPM Raflatac Oy, Tampere (FI)

(72) Inventors: Johanna Karhu, Nokia (FI); Tom Saxberg, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 108 days.

(21) Appl. No.: 15/761,865

(22) PCT Filed: Sep. 24, 2015

(86) PCT No.: PCT/FI2015/050637
§ 371 (c)(1),
(2) Date: Mar. 21, 2018

(87) PCT Pub. No.: WO2017/051065
PCT Pub. Date: Mar. 30, 2017

(65) Prior Publication Data
US 2018/0265747 A1 Sep. 20, 2018

(51) Int. Cl.
*C09J 7/38* (2018.01)
*B32B 7/06* (2019.01)
(Continued)

(52) U.S. Cl.
CPC ............... *C09J 7/385* (2018.01); *B32B 7/06* (2013.01); *B32B 7/12* (2013.01); *B32B 27/08* (2013.01); *B32B 27/10* (2013.01); *B32B 27/36* (2013.01); *B32B 29/002* (2013.01); *B32B 29/02* (2013.01); *C09J 123/08* (2013.01); *C09J 133/08* (2013.01); *B32B 2255/10* (2013.01);
(Continued)

(58) Field of Classification Search
CPC ........................................................ C09J 7/385
See application file for complete search history.

(56) References Cited

U.S. PATENT DOCUMENTS 4,110,290 A    8/1978  Mori et al.
4,128,518 A   12/1978  Oyamada et al.
(Continued)

FOREIGN PATENT DOCUMENTS

CN    102497983 A    6/2012
CN    104781361 A    7/2015
(Continued)

OTHER PUBLICATIONS

International Search Report for International Application No. PCT/FI2015/050637; International filing date: Sep. 24, 2015; dated Jan. 21, 2016; 5 pages.
(Continued)

*Primary Examiner* — Daniel H Lee
(74) *Attorney, Agent, or Firm* — Cantor Colburn LLP

(57) ABSTRACT

The invention relates to an adhesive composition, labels and label laminates containing the adhesive composition, wherein the adhesive composition comprises at least the following components: polymer(s) based on alkyl acrylic ester(s) and pressure polymerized vinyl acetate ethylene copolymer(s) comprising ethylene content between 5 and 40%. Further the invention relates to use of an adhesive composition for label laminates and labels, to use of a label for labelling of an item and to a labelled item.

16 Claims, 2 Drawing Sheets

(51) Int. Cl.
- *B32B 7/12* (2006.01)
- *B32B 27/10* (2006.01)
- *C09J 123/08* (2006.01)
- *B32B 27/08* (2006.01)
- *B32B 29/00* (2006.01)
- *B32B 27/36* (2006.01)
- *B32B 29/02* (2006.01)
- *C09J 133/08* (2006.01)

(52) U.S. Cl.
CPC ..... *B32B 2255/26* (2013.01); *B32B 2307/514* (2013.01); *B32B 2307/516* (2013.01); *B32B 2307/728* (2013.01); *B32B 2307/736* (2013.01); *B32B 2307/748* (2013.01); *B32B 2307/75* (2013.01); *B32B 2405/00* (2013.01); *B32B 2519/00* (2013.01); *C09J 2203/334* (2013.01); *C09J 2205/114* (2013.01); *C09J 2205/30* (2013.01); *C09J 2431/00* (2013.01); *C09J 2431/001* (2013.01); *C09J 2433/00* (2013.01); *C09J 2433/005* (2013.01)

(56) References Cited

U.S. PATENT DOCUMENTS

| | | | |
|---|---|---|---|
| 4,902,370 A * | 2/1990 | Dust | C09J 5/00 156/327 |
| 5,079,047 A | 1/1992 | Bogaert et al. | |
| 5,089,579 A * | 2/1992 | Sutter | C08F 218/08 526/323.2 |
| 5,622,783 A | 4/1997 | Huizer et al. | |
| 6,136,903 A * | 10/2000 | Su | C08F 265/04 524/167 |
| 2006/0246282 A1 | 11/2006 | Bohm et al. | |
| 2010/0051200 A1* | 3/2010 | Mueller | C09J 133/08 156/703 |

FOREIGN PATENT DOCUMENTS

| | | |
|---|---|---|
| JP | 2003238926 | 8/2003 |
| JP | 2003238926 A * | 8/2003 |

OTHER PUBLICATIONS

Written Opinion of the International Searching Authority for International Application No. PCT/FI2015/050637; International filing date: Sep. 24, 2015; dated Jan. 21, 2016; 9 pages.

* cited by examiner

ADHESIVE FOR LABELS, A LABEL AND LABEL LAMINATE

FIELD OF THE APPLICATION

The present application relates to an adhesive composition, labels and label laminates containing the adhesive composition. Further the application concerns a combination of a label and an item.

BACKGROUND

It is general practice to apply a label to the surface of containers, such as bottles made of polymer or glass, to provide decoration, identification and/or information, for example, on the contents of the container. The use of polymer containers, for example bottles made of thermoplastic polymers, has been increasing. One of the most popular polymer for used in bottles is polyethylene terephthalate (PET). The containers, such as bottles in the beverage industry, are generally re-used or recycled and thus there is a need for labels which are easily removed from the surface of the container during conventional washing processes such as hot dilute caustic soda. Especially there is an interest make the recycling of polymeric containers for more efficient and cost effective. Thus, removable labels are an important topic, for example, in beverage industry.

It would be desirable to produce labels which are economical but also environmentally friendly. Further it would be desirable that the labels are removable from a surface of an item allowing efficient recycling of the item. As an example, remnants or deposits of labels, such as adhesive, print ink and label face, may interfere the recycling process of PET. Remnants may cause problems with colour, clarity and processability of the recycled PET.

SUMMARY

It is an aim of the embodiments to provide an adhesive composition for labels, a label laminate and labels produced thereof. The label is suitable for labelling an article and adhering to the surface of the article, when pressure is applied onto the label at room temperature. Further, the label is detachable form the surface labelled at washing conditions.

One embodiment provides a label comprising a face layer and an adhesive layer, wherein the adhesive layer comprises a pressure sensitive adhesive composition comprising at least the following components:
  polymer(s) based on alkyl acrylic ester(s) and
  pressure polymerized vinyl acetate ethylene copolymer(s) comprising ethylene content between 5 and 40%.

One embodiment provides a label laminate comprising layers in the following order: a face layer, an adhesive layer, and a release liner, wherein the adhesive layer comprises a pressure sensitive adhesive composition comprising at least the following components:
  polymer(s) based on alkyl acrylic ester(s) and
  pressure polymerized vinyl acetate ethylene copolymer(s) comprising ethylene content between 5 and 40%.

One embodiment provides a pressure sensitive adhesive composition for labels, wherein the adhesive composition comprises at least the following components:
  polymer(s) based on alkyl acrylic ester(s);
  pressure polymerized vinyl acetate ethylene copolymer(s) comprising ethylene content between 5 and 40%.

One embodiment provides use of the pressure sensitive adhesive composition for an adhesive layer of label laminates and labels produced thereof.

One embodiment provides use of the label laminate for providing labels.

One embodiment provides a labelled item comprising an item and a label attached to the surface of the item through the adhesive layer of the label.

Further embodiments of the application are presented in the dependent claims.

According to an example the adhesive composition has the amount of the polymer(s) based on alkyl acrylic ester(s) is between 60 and 90 wt. % and the amount of the pressure polymerized vinyl acetate ethylene copolymer(s) is between 10 and 40 wt. %

According to an example the adhesive composition has the amount of the polymer(s) based on alkyl acrylic ester(s) is between 70 and 85 wt. % and the amount of the pressure polymerized vinyl acetate ethylene copolymer(s) is between 15 and 30 wt. %.

According to an example the polymer(s) based on alkyl acrylic ester(s) exhibit glass transition temperature between −55 and −20° C.

According to an example the pressure polymerized vinyl acetate ethylene copolymer(s) exhibit glass transition temperature between −40 and −7° C.

According to an example the pressure sensitive adhesive composition exhibits glass transition temperature between −40 and −10° C.

According to an example the pressure sensitive adhesive composition further comprises between 0.5 and 2 wt. % of a surface active agent.

According to an example the surface active agent includes hydrophilic part containing charged groups. The charged groups may be negatively charged.

According to an example wherein the surface active agent is dioctyl sodium sulfosuccinate.

According to an example the face layer is at least uniaxially oriented.

According to an example the face layer has shrinkage in the direction of the orientation between 5 and 70% at 80° C.

According to an example the face layer has shrinkage in the direction of the orientation between 5 and 20% at 65° C.

According to an example the adhesive layer exhibits peel adhesion in the rage of 0-1N/25 mm at conditions comprising temperature in the range of 60-90° C. and alkaline aqueous solution.

According to an example the label is wash-off label detaching from the surface labelled at the washing conditions comprising temperature in the range of 60-90° C. and alkaline aqueous solution.

According to an example the labelled item is polyethylene terephthalate bottle.

DESCRIPTION OF THE DRAWINGS

In the following some examples and embodiments will be described in more detail with reference to appended drawings, in which.

DETAILED DESCRIPTION

Figure 1:
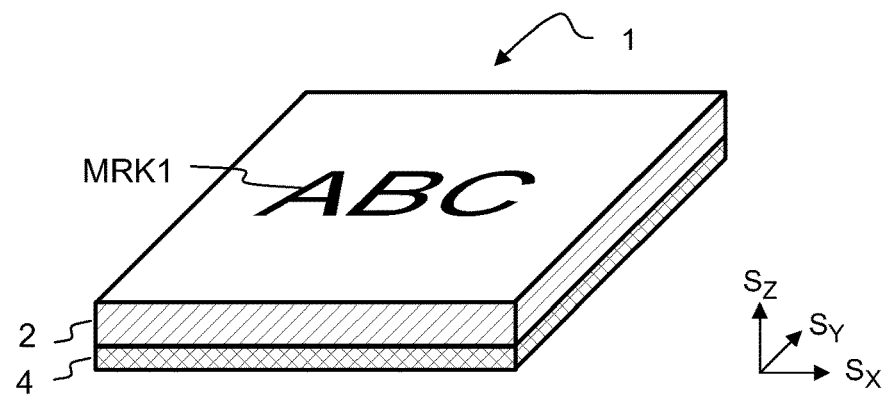
FIG. 1 shows, in a 3D view, an example embodiment of a label.

In this description and claims, the percentage values relating to an amount of raw materials are percentages by dry weight (wt. %) unless otherwise indicated. Word "comprising" may be used as an open term, but it also comprises the closed term "consisting of". Unit of thickness expressed as microns corresponds to µm. Unit of temperature expressed as degrees C. corresponds to ° C. The following reference numbers and denotations are used in this application:

MRK1 graphics,
Sx, Sy, Sz 3D coordinates,
1 a label,
2 a face layer,
4 an adhesive layer,
6 a release liner,
8 a label laminate structure,
10 a backing material (substrate)
12 a release coating,
100 an item,
101 a labelled item.

Term "label" refers to a piece of material carrying information and to be applied onto items of different shapes and materials. In the application an item is also called as an article. An item may be a package, such as a bottle. A label comprises at least a face layer. Usually the label comprises also an adhesive layer. A label comprising an adhesive layer of pressure sensitive adhesive may be referred to as a pressure sensitive adhesive (PSA) label. Pressure sensitive adhesive labels may also be referred to as self-adhesive labels. The labels consisting of PSA can be adhered to most surfaces through an adhesive layer without the use of a secondary agent, such as a solvent, or heat to strengthen the bond. The PSA forms a bond when pressure is applied onto the label at room temperature (around 25±2° C.), adhering the label to the item to be labelled. Examples of pressure sensitive adhesives include water based (water-borne) PSAs, solvent based PSAs and solid PSAs. Solid PSAs are melted during application to the surface to be coated and may also be referred to as a hot-melt PSAs. A label may further comprise other adhesive(s).

A wash-off label, also referred to as a washable label, refers to a label removable (detachable) from the surface of the item attached during subsequent washing process. A wash-off label may comprise an adhesive layer sensitive to washing conditions.

An adhesive sensitive to washing conditions refers to adhesives, wherein the adhesion of the adhesive decreases at washing conditions, which generally comprise increased temperature and alkaline conditions. Preferably the adhesion of the pressure sensitive adhesive to the labelled item decreases more than the adhesion to the face layer so that the PSA remains attached to the face layer. The increased temperature may be at least 50° C., for example 65° C., 75° C. 80° C., or 90° C. The alkaline conditions refer to an aqueous solution containing alkaline agent, such as NaOH, KOH or combination thereof. Probably the most common alkaline agent is sodium hydroxide NaOH, which is also called caustic soda. The alkaline liquid generally contains about 0.5-10% or 1-4% (by weight) of the alkaline agent(s), for example about 2%.

As an example, a label laminate comprises a facestock, a PSA layer, and further a release liner. The face layer and the release liner are typically laminated together having an adhesive layer in between, which laminated structure is referred to as a label laminate. The release liner is used to protect the adhesive layer but also to allow easier handling of the label to up to the point of labelling where the label face layer is dispensed and adhered to a surface of an item. In labelling the release liner is removed and disposed of. A wash-off label laminate refers to a label laminate structure comprising e.g. PSA layer sensitive to washing conditions and wherein the adhesion of the adhesive decreases at washing conditions so as to allow removal of the label from the surface labelled.

As an example, a label is linerless self-adhesive label. Linerless label webs or labels are provided to users without release liner over the adhesive layer. Elimination of release liners reduces the material costs of the labels but also avoids the disposal of the release liner after the application of the labels. Moreover, the exclusion of the liner decreases the thickness in a roll of labels and more labels can be provided per roll.

The linerless label structure may comprise multiple layers in the following order: a first printable layer comprising a thermoplastic polymer, a first adhesive layer comprising a pressure sensitive adhesive, a release layer comprising a release agent, and a second layer comprising a thermoplastic polymer. After printing the layers of the linerless label structure are rearranged so as to have the linerless label structure comprising the multiple layers in the following order: the release layer comprising the release agent, the second layer comprising the thermoplastic polymer, printed layer comprising printing ink(s), the first printable layer comprising the thermoplastic polymer, the first adhesive layer comprising a PSA. The rearranged linerless label structure further comprises a second adhesive between the second layer comprising the thermoplastic polymer and the first printable layer comprising thermoplastic polymer.

Alternatively, the linerlss label structure may comprise multiple layers is the following order: a release layer comprising a release agent, a layer comprising a thermoplastic polymer, a second adhesive layer, a layer comprising a thermoplastic polymer, and a first adhesive layer comprising a pressure sensitive adhesive. In one embodiment the first thermoplastic polymer layer has a printable surface. In one embodiment the second thermoplastic polymer layer has a printable surface. In the linerless label structure the print may be between the first and second thermoplastic polymer layer.

Labels may be used in wide variety of labelling applications and end-use areas, such as beverage labelling, food labelling, home and personal care product labelling, and labelling of industrial products. The surface of the labelled article may be for example plastic, glass, metal, or paper based. The labelled article may be for example a container, such as a bottle, jar, canister, can, tin or the like. The label may also be applied to semi-rigid or flexible packages used for e.g. packaging of food. Examples of articles include glass bottles, metal bottles, polyethylene terephthalate (PET) bottles, and bottles made of polyolefin, such as high density polyethylene (HDPE) and polypropylene (PP). The label may surround the labelled article, such as a bottle, completely or partially.

Term "face layer" refers to a top layer of the label, also called as a face stock, a face material layer, or face film. The face layer 2 is the layer that is adhered to the surface of an item 100 during labelling through an adhesive layer 4. The face layer may comprise e.g. printing in order to provide information and/or visual effect, such as information of the content of the item labelled. Printable face layer is suitable for printing by any of the known printing methods, such as with gravure, flexographic process, offset, screen or letterpress. The printing may exist on a top surface, reverse side or both top and reverse side of the face layer. A label consisting of a face layer, printing layer and an adhesive layer may be referred to as "a printed label". The face layer may have a monolayer or multilayer film structure comprising at least two layers. The multilayer structure may be co-extruded or it may comprise several layers laminated together.

Figure 2:
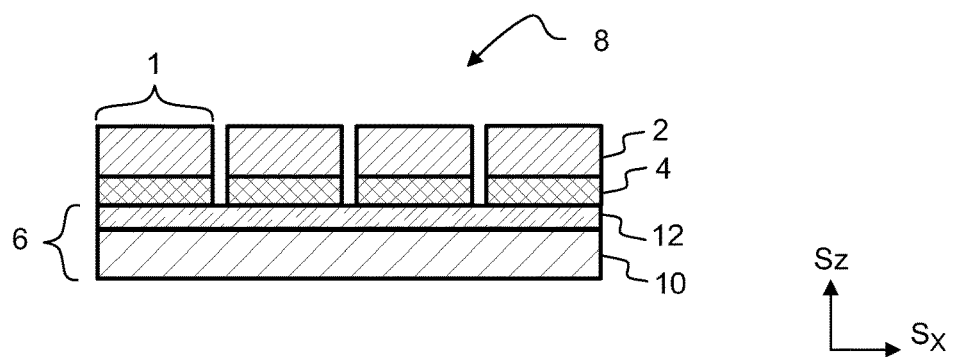
FIG. 2 shows, in a cross sectional view, cut labels attached to a common release liner.

Term "release liner" 6 refers to a structure comprising a backing material layer 10 as a substrate and a release coating layer 12 on a surface of the substrate, as shown in FIG. 2. In other words, the backing material 10 is usually coated with a thin layer of release agent, such as silicone. The release coating layer provides a non-adherent surface i.e. low adhesion and release effect against the adhesive layer. The release liner protects the adhesive layer during shipment and storage. It further allows for efficient handling of individual labels after the labels are die-cut and the surrounding matrix is stripped up to the point where the individual labels are dispensed on a labelling line. During dispensing the liner is peeled off and discarded.

Term "shrinkable" refers to a property of a face layer and a label made thereof to shrink under exposure to external energy, such as heat. External energy may be provided in form of heated washing liquid.

Term "machine direction" MD refers to the running direction Sx of the face layer or continuous label laminate during label manufacturing. "Transverse direction" TD or "cross direction" CD refers to the direction Sy perpendicular to the running direction Sx of the face layer or label laminate.

A ratio of total film thickness before and after stretching (orientation) is called a "stretch ratio" or "stretching ratio" (DR). It may also be referred to as a an orientation ratio. Stretch ratio is a non-oriented (undrawn) film thickness in relation to the oriented (drawn) film thickness. The non-oriented film thickness is the thickness after extrusion and subsequent chilling of the film. When stretching the film, the thickness of the film may diminish in the same ratio as the film stretches or elongates. For example, a film having thickness of 100 micrometres before uniaxial orientation is stretched by a stretch ratio of 5. After the uniaxial orientation the film may have a fivefold diminished thickness of 20 micrometres. Thus, the stretch ration (orientation ratio) is 5. Oriented film, such as oriented face layer, may be provided, for example, by uniaxial or biaxial stretching. Alternatively the oriented film may be provided by blown film extrusion.

"Tack" refers to an adhesive's holding power (adhesion) upon contact with the substrate. An adhesive with high initial tack will grab the substrate quickly. An adhesive with low initial tack will exhibit a low level of adhesion when applied. Tack can be measured by loop tack measurement according to FINAT Test Method no. 9 (FTM9, FINAT Technical Handbook $9^{th}$ ed., 2014). The loop tack value of adhesive is expressed as the force required to separate, at specified speed, a loop of material brought into contact with a specified area of a standard surface.

"Peel adhesion" refers to a measure of an adhesive's ability to wet out a surface and subsequently adhere to the substrate i.e. quantify the permanence of the adhesion or peel ability of the adhesive. Peel adhesion is defined as the force required to remove adhesive coated material from a standard test plate after a certain dwell time at an angle of 90 degree or 180 degree and specified speed. Peel adhesion may be measured according to FINAT Test Method no. 1 or 2 (FTM1 and FTM2, FINAT Technical Handbook $9^{th}$ ed., 2014).

"Shear resistance" refers to a measure of an adhesive's vertical holding power i.e. internal cohesive strength of the adhesive. It is generally measured by attaching a specific surface area of adhesive to a substrate, attaching a known weight to the adhesive and carrier, then measuring the amount of time the adhesive would hold the weight. Shear resistance may be measured according to FINAT Test Method no. 8 (FTM 8, FINAT Technical Handbook $9^{th}$ ed., 2014). A low-shear adhesive (soft) has more of a tendency to flow resulting in higher initial tack. However, low-shear adhesive may have a higher chance of adhesive will splitting apart under stress. A high-shear adhesive (firm) is less likely to split under stress due to its higher internal cohesive strength. The high-shear adhesive may have reduced tendency to flow and thus may have lower initial tack.

"Dynamic shear" refers to a measure of a resistance of an adhesive coated label on standardised surface to shear at a constant speed. Dynamic shear is defined as maximum force per unit width required to remove the adhesive coated label from a specified area in the direction parallel to the surface. Dynamic shear may be measured according to FINAT Test Method no. 18 (FTM 18, FINAT Technical Handbook $9^{th}$ ed., 2014).

Term "wash-off ability" refers to the ability of an adhesive label to detach itself in a washing procedure comprising washing solution at 65-90 deg C., for example at temperature of 80±2 deg C. In an example, the washing solution comprises 1% of sodium hydroxide (NaOH) and 0.3% of non-ionic surfactant (Triton X-100). In an example, the washing procedure comprises total washing time of 5 to 15 minutes and non-stop stirring of around 1000 rpm. After washing procedure the amount of detached labels is measured.

Label Structure

Referring to FIG. 1 a label 1 comprises a face layer 2 and an adhesive layer 4. Through the adhesive layer the label is attached to an item. Further the label typically includes graphical patterns MRK1 on its face layer 2. During label manufacturing, continuous face layer 2 is laminated together with a release liner 6 having the adhesive layer 4 in between so as to provide a label laminate from which the individual labels can be cut. Term "label laminate" 8 refers to a continuous structure comprising a face layer 2, an adhesive layer 4 and a release liner 6. Individual labels are die-cut from the continuous label laminate. Referring to FIG. 2, a label laminate structure 8 comprises four cut labels 1 attached to a common release liner 6. During labelling the release liner 6 is removed and the label is attached onto the surface to be labelled through the adhesive layer.

FIG. 2 presents an example embodiment of a laminated label structure 8 comprising four cut labels 1 attached to a common release liner 6. The label laminate may comprise a face layer 2, a release liner 6 and an adhesive layer 4. The adhesive layer 4 is between the release layer 12 of the liner 6 and the face layer 2. Referring to FIG. 1, label structure may further comprise printing MRK1. A top surface of the face layer 2 may be printed. The printing may be subsequently top coated in order to protect the printing. Alternatively or in addition, the reverse side of the face layer adjacent to the adhesive layer 4 may be printed.

Face Layer

A face layer of a label may be paper based, such as coated or uncoated paper, plastic film or a combination of these. In an example, a face layer comprises thermoplastic polymer. Preferably the face layer has density below 1.4 g/cm$^3$ or below 1 g/cm$^3$, when measured according to standard EN ISO 1183, (Gravimetric density of solid and liquid materials). For example, face layer density is between 0.5 and 1.4 g/cm$^3$.

The face layer may have a monolayer structure. Alternatively, it may have a multilayer structure comprising at least two layers. The face layer may have a thickness in the range of about 10-80 μm, for example in the range of about 20-60 μm, or 10-40 μm. In an example clear biaxially oriented polypropylene (BOPP) face layer may have thickness between 30 and 50 μm. In an example opaque BOPP face layer may have thickness between 50 and 60 μm. In an example, polyethylene terephthalate (PET) face layer may have thickness between 20 and 30 μm.

Plastic face layers, in contrast to paper based, may be preferred, for example due to their more appealing appearance, for example, transparency and better mechanical properties.

The plastic face layer may comprise thermoplastic polymers, such as polyolefin, polyester, polystyrene, polyurethane, polyamide, poly(vinylchloride) or any combinations of these. Alternatively, the plastic face layer may be biodegradable, such as lactic acid, starch or cellulose based. The plastic face layer may include homopolymers, copolymers or it may consists of a polymer blend. For example, the face layer may comprise mixtures of polyolefins, such as polyethylene (PE) and polypropylene (PP). In addition, the plastic face layer may comprise additives, such as pigments or inorganic fillers to provide, for example, a desired colour for the face layer. Additives may include, for example, titanium dioxide, calcium carbonate and blends thereof. Alternatively, the plastic face layer may be cavitated so as to provide opaque (white) appearance. The plastic face layer may also comprise minor amounts of other additives and/or film modifiers, e.g. plasticizers, stabilizers, anti-static agents, slip/anti-block agents.

Preferably the plastic face layer has total average density below 1.4 g/cm$^3$ or below 1 g/cm$^3$. The density may be measured according to standard EN ISO 1183 (Gravimetric density of solid and liquid materials). In one embodiment the face layer has a total average density in the range of 0.50-0.99 g/cm$^3$. In one embodiment the face layer has a total average density in the range of 0.90-0.98 g/cm$^3$. This will cause the label to float in the washing process and the PET of the bottle to sink, thus allowing for efficient recovery and recycling of the PET flakes.

The plastic face layer may be oriented (stretched) at least in one direction. The film may be stretched in a machine direction, in a transverse direction, or both. The resulting face layer is thus monoaxially (uniaxially) oriented (MO) or biaxially oriented (BO). Monoaxially oriented face layer may be machine oriented (MDO) or transverse oriented (TDO) in accordance to the direction of the orientation (stretching). Degree of orientation may be between 2 and 10 at least in one direction of the face layer. An effect of the oriented face layer is that the stiffness of the face layer is increased. The increased stiffness will help the converting of the label for example matrix stripping process, dispensing and feeding the labels to the items to be labelled.

In one embodiment the face layer is oriented. In one embodiment the face layer is non-oriented. The face layer may be mono-axially oriented or biaxially oriented. In an example, the face layer is biaxially oriented polypropylene (BOPP). In an example the face layer is monoaxially in machine direction oriented polypropylene (MDO PP). Orientation direction has effect e.g. on the direction of shrinkage i.e. the shrinkable face layer primarily shrinks in the orientation direction when applying external energy. In one embodiment the face layer is oriented and annealed and therefore non-shrinkable. In one embodiment the areal shrinkage of such non-shrinkable face layer is less than 5%, for example less than 2%, at 80° C., for example in the range of 0-5% or 0.5-2.0%. In one embodiment the face layer is non-shrinkable but expandable. Expandable face layer refers to a face having an increase of at least one dimension of the face layer, for example at least one of the following thickness (Sz), length (Sx) and width (Sy).

In one embodiment, the oriented face layer is annealed to a very low extent or non-annealed, which results in a shrinkable face layer. In an example the face layer comprises or consists of a shrinkable monoaxially oriented film having shrinkage in the direction of the orientation of at least 5% at 80° C., for example at least 10%. In an example the face layer comprises a shrinkable monoaxially oriented film having shrinkage in the direction of the orientation in the range of 5-70% at 80° C. or in the range of 10-60% or 20-60% at 80° C. In an example the face layer has shrinkage in the direction of the orientation in the range of 5-20% at 65° C. In an example the face layer is shrinkable in one direction (e.g. TD or MD) and expandable in another direction (e.g. MD or TD) at 80° C. For example, the film may have expansion 1-5% in one direction and shrinkage between 10 and 60% in another direction at 80° C.

Shrinkage and/or expansion of the label face layer may have effect on capability of the label to be washed off from the surface labelled. A shrinkage capability of the face layer generating forces providing e.g. lifting the regions of the label away from the bottle may have effect on enabling more efficient and quick removal of the label from the surface of the item attached during washing process. A shrinkage and/or expansion capability of the face layer may also have effect on allowing removal of the label at lower washing temperatures. For example, the label comprising shrinkable and/or expandable face layer is able to detach itself form the surface attached in a subsequent washing procedure comprising washing solution temperature of 60-75 deg C.

Shrinkage may be measured according to the following method: providing a sample with measured and marked 100 mm*100 mm area, placing the sample for 15 seconds to the water baths having temperatures at intervals of 5° C. from 55° C. to 98° C., cooling the sample at water bath having temperature of around room temperature, drying the sample and measuring the dimensions of the marked area of the sample. Preferably at least 3 or more parallel samples are used. Shrinkage is determined as the relative change of dimensions. The term "shrinkage" is defined with reference to the method; however, it is evident, and has been noticed, that the same shrinkage properties apply regardless of the method, provided that the same temperatures are used. I.e. the composition of heat transfer medium (air, steam, water) is not critical for shrinkage behaviour.

The face layer may be transparent or clear. From the optical point of view, high transparency of the labels may be preferred. Transparent (clear) labels are substantially transparent to visible light. Transparent no label look appearance of the label is advantageous, for example, in applications where the objects beneath the label, i.e. the surface of a bottle, should be visible through the label. Clarity of the face layer and a label comprising said face layer can be measured and evaluated by the haze values. The haze of the face layer may be lower than 25%, or lower than 10%, for example 2-6%, or 4-5%. Haze is tested according to standard ASTM D1003. When the haze of the label is low also the adhesives used should be clear or transparent.

Alternatively, the face layer may be opaque and/or white. In an embodiment of an opaque face layer, the face comprises additive to provide a desired colour. An additive may comprise one or more pigments or inorganic fillers, for example titanium dioxide, calcium carbonate and/or combination of those. In a multilayer film structure the pigment may be included in one or more of the layers. As an example, a black face layer is provided with additive carbon black. An opaque face layer may have an opacity of at least 70%, or at least 75%, or at least 80% when measured according to the standard ISO 2471. Opacity may be 70-95%, or preferably 70-80%. Alternatively, opacity may be less than 12%, when measured according to the standard ISO 2471.

Adhesive Layer

Figure 3:
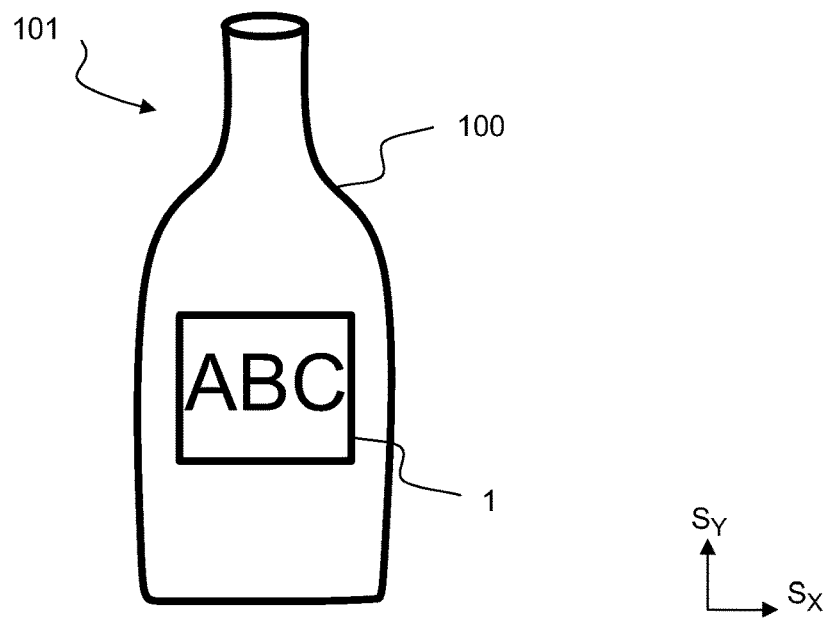
FIG. 3 shows, a label attached to an item.

Referring to FIG. 3 a label 1 can be affixed to the surface of an item (article) 100 through an adhesive layer 4 so as to form a labelled item 101. Adhesive layer provides adhesion i.e. adheres or bonds the label to the surface of the item. The adhesive layer of the label should have a suitable adhesion i.e. tack (stickiness) in order to stick to an item during labelling process. Tack is the property of adhesive that allows the immediate formation of a bond on contact with another surface. The tackiness is needed at the point the label is attached to an item. The optimum adhesion between two materials depends on, for example, the wetting and surface energy of the materials.

An adhesive layer may be a continuous coating covering 100% of the face layer surface. Alternatively, it may be applied discontinuously as spots or strips covering less than 100% of the face layer surface. For example, the adhesive may cover between 10 to 90% of the total area of the face layer. Reduced amount of adhesive may have effect on reducing the time needed for the subsequent removal of the label during washing process from the surface of the item attached.

An adhesive layer may have a thickness in the range of about 5-40 μm, or in the range of about 8-20 μm. For example, the thickness of the adhesive layer is in the range of about 5-15 μm or 5-12 μm. The amount of the adhesive layer, in dry weight, may be in the range of about 5-40 g/m$^2$, or 8-20 g/m$^2$. The amount of the adhesive may be preferably less than 15 g/m$^2$, or equal or less than 12 g/m$^2$. For example, the amount of the adhesive layer is between 5 and 15 g/m$^2$ or between 5 and 12 g/m$^2$.

According to an embodiment, an adhesive layer adjacent to the surface of the item labelled comprises or consists of a pressure sensitive adhesive(s) (PSA). The adhesive layer may comprise at least one of the following: water based (water-borne) PSA, solvent based PSA and solid PSA.

According to an embodiment the adhesive layer comprises or consist of a water-based PSA formulation (also referred to as water-borne adhesive composition) comprising acrylic polymers (polyacrylate(s)). Water-based PSA formulation comprising acrylic polymers may also be referred to as acrylic, water-borne PSA. Polyacrylate adhesives are synthesized from acrylic acid and alcohol providing alkyl acrylate (alkyl acrylic ester). Alkyl acrylates are monomers of polyacrylates.

In an example a water-based PSA formulation comprises a dispersion comprising cross-linked alkyl acrylate(s) (polyacrylate(s)) dispersed in water. For example, a water-based PSA formulation comprises an aqueous dispersion of polymer(s) based on acrylic ester(s). Solids content of the aqueous dispersion may be between 50 and 70%, or between 65 and 70%, when measured according to standard DIN EN ISO 3251. Glass transition temperature ($T_g$) of the polyacrylate of the dispersion may be between −55 and −20° C. The polyacrylate dispersion having $T_g$ of polyacrylate between −55 and −20° C. may be referred to as "low $T_g$ polyacrylate". pH of the polyacrylate dispersion may be between 3.5 and 8.5. Water as a carrier is evaporated in the drying tunnel after coating of the adhesive layer onto the surface of the substrate such as release liner or face layer. An amount of polyacrylate(s), i.e. polymer(s) based on alkyl acrylic ester(s), in the PSA composition may be, in dry weight, between 60 and 90 wt. %, preferably between 60 and 85 wt. %, between 70 and 85%, or between 70 and 80 wt. %.

The water-borne PSA formulation further comprises pressure polymerized vinyl acetate ethylene copolymer(s) (VAE). Pressure polymerized vinyl acetate ethylene copolymers are water based emulsions. The vinyl acetate ethylene (VAE) copolymer is a product based on the copolymerization of vinyl acetate and ethylene. The pressure polymerized VAE polymerization utilizes high-pressure reactions ranging between 1000-2000 psi. The vinyl acetate content of VAE may be between 60 and 95%, and the ethylene content may be between 5 and 40% of the total formulation. In an example, the vinyl acetate ethylene copolymer may comprise ethylene between 10 and 40%, preferably between 20 and 35%. An amount of ethylene monomers may have effect on glass transition temperature of the VAE. For example, increase in ethylene content may provide degrease in glass transition temperature. Solids content of the water based VAE emulsion may be between 40 and 75%, preferably between 55 and 70%. Viscosity may be between 160 and 175 mPas, for example 168 mPas. pH may be below 6.5, for example 5.7. Glass transition temperature ($T_g$) of pressure polymerized vinyl acetate ethylene copolymer(s) may be between −40 and −7 deg C., preferably between −30 and −10 deg C. An amount of pressure polymerized vinyl acetate ethylene copolymer(s) in the pressure sensitive adhesive composition may be, in dry weight, between 10 and 40 wt. % or between 15 and 30 wt. %.

Pressure polymerized vinyl acetate ethylene copolymer(s) (VAE) may have effect on cohesion (shear resistance) of the adhesive layer. It may also have effect on hardness at room temperature of around 25 deg C. It may further have effect on providing enhanced removability at washing temperatures between 65 and 90 deg C.

In an example the acrylic water-borne PSA formulation further comprises surfactant(s). Surfactant may also be referred to as a surface active agent. Surfactants have amphiphilic nature i.e. surfactants have a hydrophobic part and a hydrophilic part. Dependent on the nature of the hydrophilic part the surfactant may be anionic, cationic, non-ionic or amphoteric. In an example, the hydrophilic part of the surfactant contains charged groups. Preferably, the surfactant contains anionic groups, i.e. negatively charged groups. Thus, the surfactant may be referred to as anionic surfactant. Negatively charged groups include e.g. sulphonate, sulphate or carboxylate. Anionic surfactant may be dioctyl sodium sulfosuccinate (often referred to as DOSS, DSS). In an example, surfactant may be a mixture comprising 56-60% of 1,4-Bis(2-ethylhexyl)sodium sulfosuccinate, 20% of Propan-2-ol; isopropyl alcohol; isopropanol, and 20% of water. An amount of surfactant may be between 0.5 and 4 wt. % or between 0.5 and 2 wt. %. Surfactant may have effect on removability of the adhesive from the surface labelled. In an example, the surfactant containing charged groups, preferably anionic, may have effect on enhancing water absorbance of the adhesive layer, thus swelling the adhesive layer, reducing of adhesion and enhancing removability. In addition, the surfactant may have effect on weakening the bonds between the adhesive layer and the surface the label is attached, such as surface of the bottle. Thus, the adhesive layer may detached from the surface labelled and remain attached on the face layer surface.

The adhesive formulation may further comprises at least one of the following modifiers: tackifier and plasticizer. In addition, the adhesive formulation may comprise thickener(s), such as ASE, HASE and/or HEUR type of thickeners, foam inhibitor(s), and/or pH adjusting agent(s), such as NaOH and ammonia. Total amount of modifier(s) may be between 1-20 wt. %. In an example acrylic water-borne PSA formulation may comprise tackifying resin(s). Tackifying resin may have effect on bonding (adhesion) properties of the adhesive. Tackifier may be at least one of the following: hydrocarbon resin, rosin ester resin, rosin acid resin and terpene resin. Hydrocarbon resin may be aliphatic or aromatic resin. Preferably, the hydrocarbon resin is hydrogenated. Hydrogenated resin may be based on aliphatic HC comprising five carbons (C5) or aromatic HC comprising nine carbons (C9). In an example, tackifier is fully hydrogenated rosin ester resin. In an example, tackifier may be a blend of rosin ester resin and hydrocarbon resin.

In an example, the acrylic water-borne PSA formulation may further comprise plasticizer(s). Plasticizer may be at least one of the following: DINCH (di-isononylcylic hexanedicaboxylate), benzoate, adipate and citrate.

In an example, a water-based (water-borne) PSA formulation comprising at least the following components: 60 and 90 wt. % of polymer(s) based on acrylic ester(s) i.e. low $T_g$ polyacrylate(s) and 10 and 40 wt. % of pressure polymerized vinyl acetate ethylene (VAE) copolymer(s) comprising ethylene content between 5 and 40% may have a glass transition temperature between −40 and −10 deg C., when measured using rheometer and following parameters: 8 mm plate to plate disc, temperature in range of −40 to +120 degrees C., constant strain (gamma) from 0.02% to 0.1% depending on sample, frequency (f) 1 Hz.

At least some/all embodiments of the acrylic water-borne pressure sensitive adhesive are sensitive to washing conditions. The adhesive layer sensitive to washing conditions is able to reduce its adhesion (tackiness) in washing conditions. At least some/all embodiments of the adhesive formulations provide an effect of immediate tack after application to the surface to be labelled without use of a secondary agent to strengthen the bond, but also reduced adhesion at elevated temperatures, for example between 60 and 90° C. in alkaline solution.

As an example, pressure polymerized vinyl acetate ethylene copolymer(s) (VAE) has effect on enhancing the cohesion of the adhesive comprising low $T_g$ polyacrylate at room temperature (25±2° C.). It also has effect on decreasing the cohesion of the adhesive layer comprising low $T_g$ polyacrylate at washing conditions comprising temperature between 60 and 90° C. in alkaline solution. The above presented effects are illustrated in the following table 1, in which the storage modulus (G") values presenting elastic properties and loss modulus (G") values presenting viscous properties of the samples A-C are provided at temperatures of 25° C. and 80° C., when measured using rheometer. Reference sample A) consists of pressure sensitive adhesive of low $T_g$ polyacrylate(s), reference sample B) consists of pressure polymerized vinyl acetate ethylene copolymer(s) (VAE), and sample C) consists of an acrylic water-borne pressure sensitive adhesive composition including between 70 and 85 wt. % of low $T_g$ polyacrylate(s), between 15 and 30 wt. % of pressure polymerized vinyl acetate ethylene copolymer(s) (VAE), and between 0.5 and 2 wt. % of anionic surfactant.

TABLE 1

| Sample | G' at 25° C., Pa | G' at 80° C., Pa | G" at 25° C., Pa | G" at 80° C., Pa |
|---|---|---|---|---|
| A) | 59 000 | 20 000 | 24 000 | 12 000 |
| B) | 420 000 | 25 000 | 280 000 | 21 000 |
| C) | 88 000 | 15 000 | 44 000 | 11 000 |

Based on the above results of table 1, it can be observed that at room temperature (25° C.) both the storage modulus G' value describing elasticity/hardness and the cohesion value (G'−G") of the adhesive formulation C) are higher than the corresponding values of the adhesive formulation A) consisting of low $T_g$ polyacrylate(s). The hardness and cohesion values of the adhesive formula C) has effect providing good adhesion of the adhesive to the surface attached, such as surface of the bottle, at room temperature (25° C.). Accordingly, at temperature of 80° C. corresponding to washing temperature, the adhesive formulation C) has lower storage modulus G' value and cohesion value (G'−G") having effect on the increased wash-off ability of the adhesive formulation C) when compared to the pressure sensitive adhesive formulation A).

At least some/all embodiments of the an acrylic water-borne pressure sensitive adhesive (PSA) composition comprising low $T_g$ polyacrylate(s) and polymerized vinyl acetate ethylene copolymer(s) (VAE) provide an effect of withstanding per acetic acid treatment used e.g. in beverage production lines for sterilizing bottles without losing adhesive properties. For example, dynamic shear of the adhesive before and after rinsing with PAA may be between 25 and 35 N/12.5 mm. For example, at least some/all embodiments of the adhesive may have peel adhesion on PET after PAA treatment between 9 and 15 N/25 mm at room temperature 23° C.±2° C. and 50%±5% RH.

At least some/all embodiments of the acrylic water-borne pressure sensitive adhesive composition comprising low $T_g$ polyacrylate(s) and polymerized vinyl acetate ethylene copolymer(s) (VAE) provide advantages in PET bottle labelling. For example, the adhesive may remain its adhesivity and provide effective bonding of the labels even if submersed in cold water. However, the labels are removable (detachable) in the PET recycling process comprising warm alkaline water. Further, the adhesive may enable improved adhesion onto the PET surface at room temperature. For example tack on PET may be between 10 and 13 N/25 mm, when measured according to FTM 9 at +23° C.

At least some/all embodiments of the acrylic water-borne pressure sensitive adhesive composition comprising low $T_g$ polyacrylate(s) and polymerized vinyl acetate ethylene copolymer(s) (VAE) provide good aging and UV-resistance properties. Further, the adhesive may have effect on providing sufficient surface tension enabling good adhesion (tack) and easy labelling to polar substrates such as glass steel, polyamide, PET and polystyrene (PS). Good tack may be provided also to substrates of polyethylene (PE). For example tack on PE may be between 4 and 6 N/25 mm, when measured according to FTM 9.

At least some/all embodiments of the acrylic water-borne pressure sensitive adhesive comprising low $T_g$ polyacrylate(s) and polymerized vinyl acetate ethylene copolymer(s) (VAE) may have effect on reducing the peel adhesion of the label from the surface of the item labelled when in contact with alkaline washing liquid at elevated temperatures e.g. 1.0-2.0% solution of sodium hydroxide (NaOH) at 65-90 degrees C. Low peel adhesion at washing conditions may have effect of providing easy and effective separation of the labels.

The adhesive properties, such as peel adhesion of the acrylic water-borne pressure sensitive adhesive layer comprising low $T_g$ polyacrylate(s) and polymerized vinyl acetate ethylene copolymer(s) (VAE) degrade or diminish when applied to the washing conditions. Peel adhesion corresponds to a force required to detach a self-adhesive label. At room temperature the peel adhesion may be up to 25 N/25 mm. For example, peel adhesion at RT may be between 7 and 25 N/25 mm, or between 7 and 20 or between 7 and 15 N/25 mm. The peel adhesion may decrease by at least 30%, preferably by at least 90% or by at least 95% when the labelled item is subjected to washing conditions, for example 1.0-2.0% solution of sodium hydroxide (NaOH) at 65-90 degrees C. The loss in peel adhesion may provide lifting of the label from the surface of the item labelled and facilitate the ingress of the washing liquid between the adhesive and the surface of the item further enhancing the removal of the label. At least in some embodiments reduction in adhesion force is such that a label attached with the adhesive layer to an article starts detaching from an article at an elevated temperature in alkaline water. In the washing conditions in the alkali solution the peel adhesion may be in the range of 0-1 N/25 mm, for example 0-0.5 N/25 mm, or 0-0.1 N/25 mm, even 0-0.05 N/25, or even less, such as 0-0.025 N/25 mm at 90° C., 80° C., 75° C. or 65° C. In an example, the adhesive layer comprising polymer(s) based on alkyl acrylic ester(s) and pressure polymerized vinyl acetate ethylene copolymer(s) exhibits peel adhesion in the rage of 0-1N/25 mm in alkaline aqueous solution at temperature in the range of 60-90° C. so as to provide wash-off ability for the label.

Adhesive composition(s) may further have effect on retaining the sufficient cohesion of the adhesive layer so that it does not become soluble into the washing liquid and the washing liquid does not become contaminated with the adhesive. Sufficient cohesion and low solubility of the adhesive in washing conditions may have effect on preventing the contamination of the washing solution, such as aqueous alkaline solution with dissolved adhesive. This prolongs the lifetime of the washing solution and also prevents the contamination of the recyclable items, such as bottles.

Manufacturing of Labels, Labelling and Removal of Labels

A method for manufacturing labels according to embodiments may comprise at least the following steps:
   providing a face stock layer,
   providing a release liner,
   applying an acrylic water-borne PSA formulation comprising at least the following components: polymer(s) based on acrylic ester (s) (polyacrylate(s)) and a pressure polymerized vinyl acetate ethylene copolymer(s) (VAE) on a face stock layer or to a release liner,
   drying the adhesive layer (evaporating the water),
   laminating the face stock layer and the release liner together with the adhesive layer in between so as to provide a label laminate,
   cutting, for example die-cutting, the label laminate structure to obtain individual labels.

A method for manufacturing linerless labels may comprise the following steps:
   providing a printable label structure having a printable surface and multiple layers in the following order:
      a first layer comprising a thermoplastic polymer,
      a first adhesive layer comprising a pressure sensitive adhesive comprising at least the following components: polymer(s) based on acrylic ester(s) (polyacrylate(s)) and pressure polymerized vinyl acetate ethylene copolymer(s) (VAE),
      a release layer comprising a release agent, and
      a second layer comprising a thermoplastic polymer;
   printing on the printable surface;
   separating the first layer and the first adhesive layer, from the release layer and the second layer;
   rearranging the release layer and the second layer on top of the first layer and the first adhesive layer, with the release layer on top of the construction; and
   laminating the first layer and the second layer together with a second adhesive layer to obtain the linerless labels.

A further step prior to labelling includes die-cutting the linerless label structure through all the layers to for a predefined shape for the label. The step also includes defining an uncut bridge between the individual die-cut shapes to for a continuous structure having plurality of individual shapes attached to each other.

A method for manufacturing a linerless label may comprise providing a linerless label structure comprising the layers in the following order:
   a release layer comprising a release agent,
   a layer comprising a thermoplastic polymer,
   a second adhesive layer,
   a layer comprising a thermoplastic polymer,
   a first adhesive layer comprising a pressure sensitive adhesive comprising at least the following components: polymer(s) based on acrylic ester(s) (polyacrylate(s)) and a pressure polymerized vinyl acetate ethylene copolymer(s)(VAE).

The manufacturing may further comprise printing so as to provide print layer between the first and second thermoplastic polymer layer.

A further step prior to labelling includes die-cutting the linerless wash-off label structure through all the layers to for a predefined shape for the label. The step also includes defining an uncut bridge between the individual die-cut shapes to for a continuous structure having plurality of individual shapes attached to each other.

In manufacturing a label laminate an adhesive layer 4 comprising an acrylic water-borne PSA formulation may be applied onto a thermoplastic polymer layer, such as the face layer 2 or the first layer comprising a thermoplastic polymer. Alternatively, the adhesive layer 4 may be applied onto the release liner 6. Release liner and face layer are further attached (laminated) together in order to form a label laminate structure. An adhesive layer comprising or consisting of a water-based PSA formulation comprising polyacrylate(s) may be applied e.g. by using a curtain coating, reverse gravure, slot-die, or roller-coating methods. The water of the adhesive layer applied may be removed in a drying tunnel by using e.g. hot air jets or infra-red heaters.

The adhesive layer may be applied as a continuous coating covering 100% of the face surface. Alternatively, it may be applied discontinuously as spots or strips covering less than 100% of the second surface of the face. For example, the adhesive may cover between 10 to 90% of the total area of the second surface. Reduced amount of adhesive may reduce the overall label costs. Reduced amount of adhesive may also have effect on wash-off capability of the label.

Examples of the Label Structure

In an example, the label comprises white, biaxially oriented polypropylene face having thickness of around 60 microns coated with a pressure sensitive adhesive layer (PSA) comprising at least the following components: polymer(s) based on acrylic ester(s) (polyacrylate(s)) and pressure polymerized vinyl acetate ethylene copolymer(s) (VAE). Opacity of the label may be 80%, when measured according to DIN 5333146/1.

In an example, the label comprises white, monoaxially oriented polypropylene face having thickness of around 60 microns coated with a pressure sensitive adhesive layer (PSA) comprising at least the following components: polymer(s) based on acrylic ester(s) (polyacrylate(s)) and pressure polymerized vinyl acetate ethylene copolymer(s) (VAE). Opacity of the label may be 80%, when measured according to DIN 5333146/1.

In an example, the label comprises shrinkable plastic face film having shrinkage of at least 5% at 65° C. in one direction of the film, namely TD or MD, which is coated with a pressure sensitive adhesive layer (PSA) comprising at least the following components: polymer(s) based on acrylic ester(s) (polyacrylate(s)) and pressure polymerized vinyl acetate ethylene copolymer(s) (VAE).

In an example, the label comprises clear, monoaxially oriented polypropylene face having thickness of around 40 microns coated with a pressure sensitive adhesive layer (PSA) comprising at least the following components: polymer(s) based on acrylic ester(s) (polyacrylate(s)) and pressure polymerized vinyl acetate ethylene copolymer(s) (VAE).

In an example, the label comprises clear, biaxially oriented PET face having thickness of around 25 microns coated with a pressure sensitive adhesive layer (PSA) comprising at least the following components: polymer(s) based on acrylic ester(s) (polyacrylate(s)) and pressure polymerized vinyl acetate ethylene copolymer(s) (VAE).

In an example, the label comprises clear, monoaxially oriented PET face having thickness of around 25 microns coated with a pressure sensitive adhesive layer (PSA) comprising at least the following components: polymer(s) based on acrylic ester(s) (polyacrylate(s)) and pressure polymerized vinyl acetate ethylene copolymer(s) (VAE).

During labelling the individual labels of the label laminate structure are removed from the liner and attached onto the surface of the item, such as a bottle, through the adhesive layer comprising water-based PSA formulation comprising polyacrylate(s) and pressure polymerized vinyl acetate ethylene copolymer(s) (VAE) so as to provide labelled item. Labelling may be provided in high speed automatic labelling lines. Bottle may be, for example polyethylene terephthalate bottle or glass bottle. The linerless labels are suitable for labelling and attaching onto the surface of the item as such through the first adhesive layer comprising water-based PSA formulation comprising polyacrylate(s) and pressure polymerized vinyl acetate ethylene copolymer(s) (VAE).

Labelled items, such as bottles, are generally reused or recycled several times. The labels comprising polymeric (plastic) face layer, in contrast to the paper based, have e.g. a superior wet strength and transparency, and they can be dispensed onto the bottles and other containers in standardised machines, without a need to work with separate adhesives, as for example in the case of the wet-glue paper label. Because polymeric labels do not possess the water permeability of the paper labels, the polymeric labels may be more difficult to remove completely with the existing washing process. Thus, there is a need for an improved adhesive formulations and labels that when used in conjunction with polymer-based items would permit an efficient and cost-effective recycling process of the items.

Figure 4:
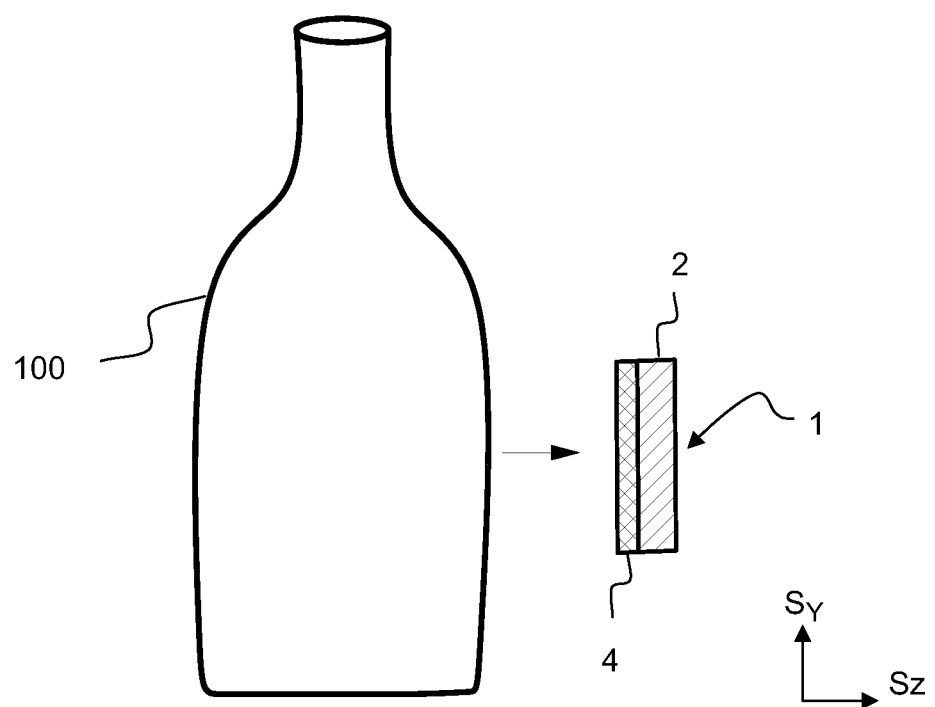
FIG. 4 shows, a label removed from the surface of an item.

Referring to FIG. 4, in the washing process the label 1 comprising the water-based PSA formulation is detached from the labelled item, for example from the surface of the bottle. In washing conditions the adhesive layer 4 loses its adhesion under the influence of washing conditions to some degree enabling removal of the label from the surface of the item labelled. Preferably the adhesive layer does not dissolve in the washing liquid. Preferably the adhesive layer 4 is adhered to the face layer 2 after removal of the label 1 from the surface of an item 100.

The washing process may comprise an elevated temperature and an alkaline washing solution. Washing conditions of recyclable containers, such as glass containers, comprise temperatures in the range of 60-90° C. (degrees C.), or 65-85° C., or preferably at temperatures above 77° C. in aqueous solution. For polyester or plastic containers the washing temperature may be 65-75° C., or even higher such as about 80° C. Washing liquid usually comprises caustic soda, for example sodium hydroxide. The washing liquid may be 1-4%, preferably 1-2% alkaline water. During washing process the label is exposed to a washing liquid of certain temperature and the adhesive layer loses its adhesion to at least some extent. In one example the labelled items go into a pre-wash chamber at 50° C. for about one minute before they go into the washing chamber at 80° C.

In a polyester bottle recycling process the labelled bottles are crushed into smaller pieces, washed in a hot caustic solution where the label is expected to detach from the polyester and float to the surface of the solution where it is removed, whilst the polyester of the bottle sinks to the bottom of the container. In this way, both label and bottle are separated and recycled.

The polyester recycling process requires that the label separates from the bottle, either in whole or in pre-crushed form, and then floats to the surface of the solution. The polyester having density of around 1.4 g/cm$^3$ conversely sinks to the bottom of the solution. In this way, for example both the polypropylene label having density below 1 g/cm$^3$ and the polyester can be recovered and recycled. This is not possible with labels comprising facestock having density are greater than one as they sink together with the polyester and cannot be separated.

EXAMPLES

In below some examples of adhesive labels and their properties are presented.

Adhesive Properties

Reference sample consists of a pressure sensitive adhesive composition including 98 wt. % of low $T_g$ polyacrylate(s) and 2 wt. % of anionic surfactant on a biaxially oriented polypropylene (BOPP) face layer.

Sample 1 consists of an acrylic water-borne pressure sensitive adhesive composition including between 70 and 85 wt. % of low $T_g$ polyacrylate(s), between 15 and 30 wt. % of pressure polymerized vinyl acetate ethylene copolymer(s) (VAE), and between 0.5 and 2 wt. % of anionic surfactant on a biaxially oriented polypropylene (BOPP) face layer.

All samples (three parallel samples) were tested prior to and after rinsing with per acetic acid solution (denoted with PAA). Tests were provided according to test procedures provided in FINAT Technical Handbook 9$^{th}$ ed., 2014. Test results (average of three parallel samples) are shown in the table 2.

TABLE 2

|  | Reference | Sample 1 |
|---|---|---|
| Tack on glass, +23° C. (FTM9) [N/25 mm] | 8.7 | 9.1 |
| Tack on PET, +23° C. (FTM9) [N/25 mm] | 8.9 | 11.9 |
| Peel on PET, 20 min +23° C. (FTM2) [N/25 mm] | 8.9 | 8.1 |
| Peel on PET, PAA, 20 min +23° C. (FTM2) [N/25 mm] | 8.7 | 11.3 |
| Dynamic shear, +23° C. (FTM18) [N/12.5 mm] | 44.7 | 27.5 |
| Dynamic shear, PAA, +23° C. (FTM18) [N/12.5 mm] | 17.8 | 32.6 |

Based on the test results sample 1 has increased immediate tack on both the PET and the glass surfaces when compared to reference sample. Also increased values of peel and dynamic shear of peracetic acid treated samples were observed. Increased values of peel and dynamic shear after peracetic acid treatment are advantageous especially when labelling of bottles that are further sterilized with PAA after labelling, thus ensuring adherence of the label on the surface of the bottle labelled.

Removability

Following some examples of label structures and their wash-off results are presented.

Reference samples were as follows:
1) control samples comprising PET bottle without labels and
2) control samples comprising PET bottle with wash-off label currently on market.

Test samples were as follows:
A) test samples comprising a white biaxially oriented polypropylene facestock having thickness of around 60 microns and an adhesive layer comprising pressure sensitive adhesive composition including 98 wt. % of low $T_g$ polyacrylate(s) and 2 wt. % of anionic surfactant. Coating weight of the adhesive composition was 14 g/m². Total density of the label structure comprising the face and the adhesive layer was around 1.05 g/cm³.

B) test samples comprising a white biaxially oriented polypropylene facestock having thickness of around 60 microns and an adhesive layer comprising a pressure sensitive adhesive composition including between 70 and 85 wt. % of low $T_g$ polyacrylate(s), between 15 and 30 wt. % of pressure polymerized vinyl acetate ethylene copolymer(s) (VAE), and between 0.5 and 2 wt. % of anionic surfactant. Coating weight of the adhesive composition was 14 g/m². Total density of the label structure was around 1.05 g/cm³.

Control sample labels 2) and test sample labels A) and B) were labelled on to a surface of the PET bottle with 20% label coverage. Further a control sample 1) including a PET bottle without a label was measured. The labelled bottles and the control sample 1) without a label were crushed into flakes prior to washing procedure.

The washing procedure included the following steps:
exposing the crushed flakes exposed to a caustic washing solution comprising:
1% of sodium hydroxide (NaOH) and 0.3% of non-ionic surfactant (Triton X-100);
agitating the flakes in the washing solution with 1000 rpm at 88±2 deg C. for 15 minutes;
rinsing the flakes with tap temperature water of around 50 deg C. with agitation so as to remove the caustic washing solution;
removing the separated flotable material from the flake material after material has settled;
drying the flakes at ambient air;
analyzing the flakes for residual adhered labels after oven test. In the oven test the flake material is heated to temperature of 60 deg C. The residual labels have tendency to get yellow and can thus be recognized on the PET flakes by using yellowness value (b*).

Test results of 5 parallel test samples are provided in the table 3.

TABLE 3

| Test sample | b* (yellowness) |
|---|---|
| 1) Control bottle without label | 6.98 |
| 2) Control bottle with control label | 7.86 |
| Sample A) | 8.24 |
| Sample B) | 7.87 |

Based on the test results the sample B labels were removed from the PET bottle surface quite efficiently during washing process and PET flakes showed only some yellowness value (b*) after oven test when compared to control bottle without a label attached.

In addition, was-off test results also showed ability of the adhesive labels comprising adhesive layer of pressure sensitive adhesive composition comprising between 60 and 90 wt. % of low $T_g$ polyacrylate(s), between 10 and 40 wt. % of pressure polymerized vinyl acetate ethylene copolymer(s) (VAE), and between 0.5 and 2 wt. % of anionic surfactant, to detach in washing procedure comprising washing solution at temperature of 65-90° C. At least 90% of the labels were observed to remove from the PET surface labelled after 5 min washing treatment with washing solution at 80° C. and comprising 1% NaOH.

For the person skilled in the art, it will be clear that modifications and variations of the products and the methods according to the present invention are perceivable. It should be clear that aspects of the various embodiments may be interchanged both in whole or in part. The drawings are schematic. The particular embodiments described above with reference to the accompanying drawings are illustrative only and not meant to limit the scope of the invention, which is defined by the appended claims.

The invention claimed is:

1. A pressure sensitive adhesive composition for wash-off labels detaching from the surface labelled at the washing conditions comprising a temperature in the range of 60-90° C. and alkaline aqueous solution, where the adhesive composition consists of the following components:
    between 70 and 85 weight percent (dry weight) of poly(alkyl acrylate(s));
    between 15 and 30 weight percent (dry weight) of pressure polymerized vinyl acetate ethylene copolymer(s) comprising an ethylene content between 5 and 40%;

between 0.5 and 2 wt. % of a surface active agent including a hydrophilic part containing negatively charged groups; and optionally, modifier(s), thickener(s), foam inhibitor(s), pH adjusting agent(s), or a combination thereof.

2. A pressure sensitive adhesive composition according to claim 1, wherein the amount of the polymer(s) based on poly(alkyl acrylate(s)) is between 70 and 80 wt. %.

3. A pressure sensitive adhesive composition according to claim 1, wherein the polymer(s) based on poly(alkyl acrylate(s)) exhibits a glass transition temperature between −55 and −20° C.

4. A pressure sensitive adhesive composition according to claim 1, wherein the pressure polymerized vinyl acetate ethylene copolymer(s) exhibits glass transition temperature between −40 and −7° C.

5. A pressure sensitive adhesive composition according to claim 1, wherein the pressure sensitive adhesive composition exhibits a glass transition temperature between −40 and −10° C.

6. A pressure sensitive adhesive composition according to claim 1, wherein the adhesive layer exhibits peel adhesion in the range of 0-1 N/25 mm at conditions comprising a temperature in the range of 60-90° C. and alkaline aqueous solution.

7. A wash-off label laminate comprising layers in the following order: a face layer, an adhesive layer, and a release liner, wherein the adhesive layer comprises a pressure sensitive adhesive composition according to claim 1.

8. A wash-off label laminate according to claim 7, wherein the face layer is at least uniaxially oriented.

9. A wash-off label laminate according to claim 7, wherein the face layer has shrinkage in the direction of the orientation between 5 and 70% at 80° C.

10. A wash-off label laminate according to claim 7, wherein the face layer has shrinkage in the direction of the orientation between 5 and 20% at 65° C.

11. A wash-off label comprising a face layer and an adhesive layer, wherein the adhesive layer comprises a pressure sensitive adhesive composition according to claim 1, and wherein the wash-off label is detaching from the surface labelled at the washing conditions comprising temperature in the range of 60-90° C. and alkaline aqueous solution.

12. A labelled item comprising an item and a wash-off label according to claim 11, wherein the wash-off label is attached to the surface of the item through the adhesive layer of the wash-off label.

13. A labelled item according to claim 12, wherein the item is polyethylene terephthalate bottle.

14. A wash-off label according to claim 11, wherein the face layer is at least uniaxially oriented.

15. A wash-off label according to claim 14, wherein the face layer has shrinkage in the direction of the orientation between 5 and 70% at 80° C.

16. A wash-off label according to claim 14, wherein the face layer has shrinkage in the direction of the orientation between 5 and 20% at 65° C.

* * * * *